United States Patent
Gurkok et al.

(10) Patent No.: US 10,397,249 B2
(45) Date of Patent: Aug. 27, 2019

(54) INTRUSION DETECTION BASED ON LOGIN ATTEMPTS

(71) Applicant: salesforce.com, inc., San Francisco, CA (US)

(72) Inventors: Cem Gurkok, Coral Gables, FL (US); Arun Kumar Jagota, Sunnyvale, CA (US); Navin K. Ramineni, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 158 days.

(21) Appl. No.: 15/408,483

(22) Filed: Jan. 18, 2017

(65) Prior Publication Data
US 2018/0205748 A1    Jul. 19, 2018

(51) Int. Cl.
*H04L 29/06*    (2006.01)

(52) U.S. Cl.
CPC ........ *H04L 63/1416* (2013.01); *H04L 63/083* (2013.01); *H04L 63/102* (2013.01)

(58) Field of Classification Search
CPC ............... H04L 63/1416; H04L 63/102; H04L 63/083–0846; H04L 63/104; H04L 63/1408; H04L 63/1433; H04L 63/20–205; G06F 21/31; G06F 21/316; G06F 21/552
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

OTHER PUBLICATIONS

U.S. Appl. No. 13/986,251, filed Apr. 16, 2013.

*Primary Examiner* — Kevin Bechtel
(74) *Attorney, Agent, or Firm* — Dergosits & Noah LLP; Todd A. Noah

(57) ABSTRACT

An attempt by a user to login to a destination server is identified from a source server. A destination score is determined based on the count of attempts by the user to login to the destination server and the count of attempts by the user to login to all destination servers. A source given destination score is determined based on the count of attempts by the user to login from the source server to the destination server, and the count of attempts by the user to login to the destination server. An outlier score is determined based on values associated with the destination score and the source given destination score. An alert is output if the outlier score satisfies a threshold.

18 Claims, 3 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven, et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0175266 A1* | 7/2008 | Alperovitch ......... G06F 21/554 370/465 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0181968 A1* | 6/2014 | Ge ..................... H04L 63/1416 726/23 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2016/0057169 A1* | 2/2016 | Honda ................. H04L 63/083 726/1 |

\* cited by examiner

INTRUSION DETECTION BASED ON LOGIN ATTEMPTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Typically, software and Internet-based companies own many servers, databases, and file-systems that can hold an enterprise's data and/or software, which could ruin the enterprise if the security of the data and/or software was breached. Cloud-based companies that hold data for a large numbers of customers are especially sensitive to security. Even a single security breach in which just one customer's data and/or software is stolen could severely damage the reputation of a cloud-based company.

Even though many software applications have been created to monitor servers, databases, and file systems for suspicious activity, intrusion detection has remained a fundamentally difficult problem. Complex computer systems may track a long-trail of unusual activity by users, but only a small percentage of such activity may be malicious. Sufficiently large amounts of data are not available to identify which activities were confirmed to be malicious and which activities were not malicious. Consequently, many intrusion detection systems resort to unsupervised methods, which tend to take some form of an "unusualness" detector, but such detections typically have high false positive rates. Furthermore, a persistent and/or sophisticated intruder attempts to circumvent any installed detection system by hiding their activity, making this activity difficult to be detected as "unusual." Additionally, if such an intruder has knowledge of methods used by common intrusion detection systems in general, or the specific intrusion detection system used by a particular company, the intruder can use this knowledge to avoid detection.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
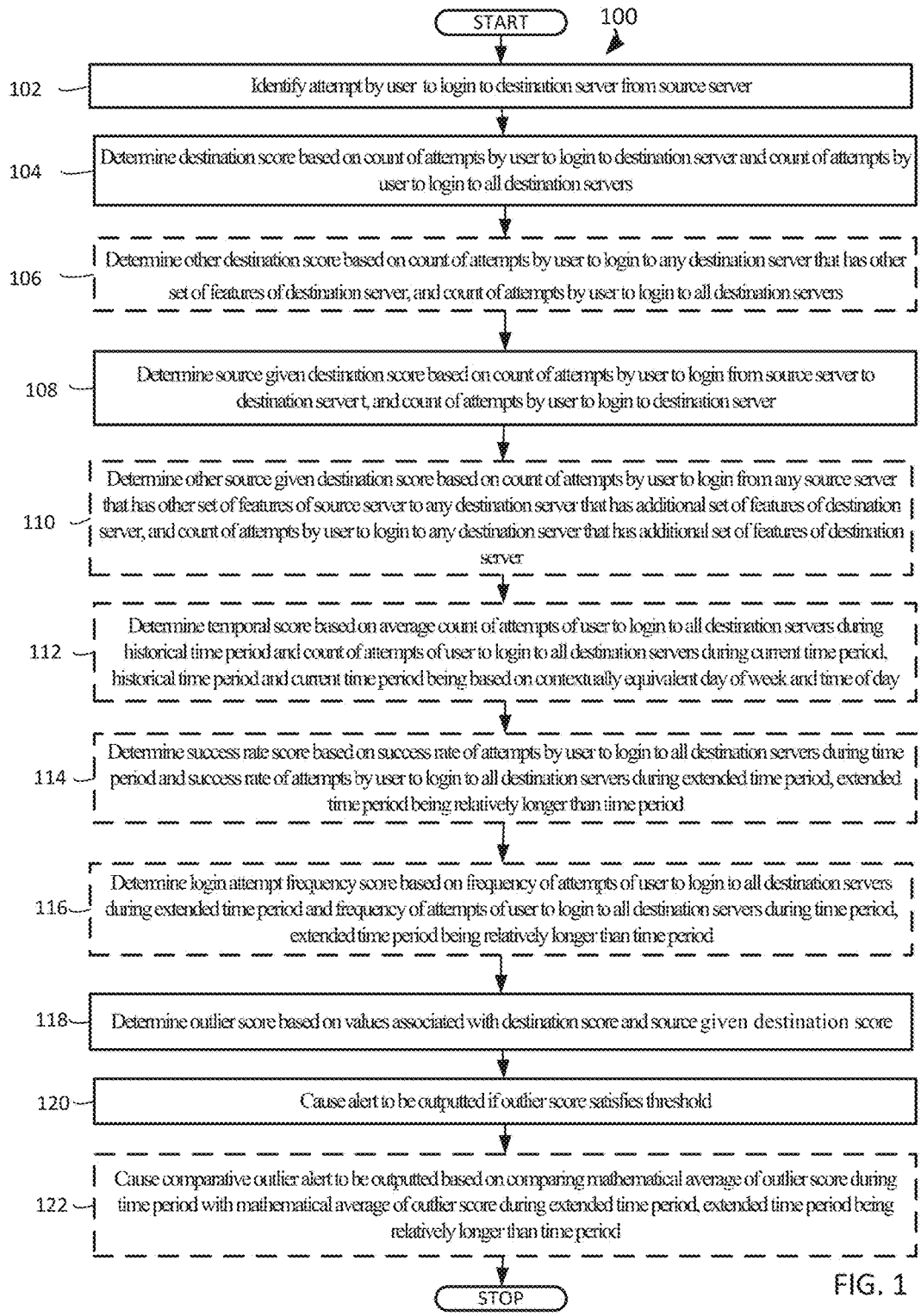
FIG. 1 is an operational flow diagram illustrating a high level overview of a method for intrusion detection based on login attempts, in an embodiment.

In accordance with embodiments described herein, there are provided methods and systems for intrusion detection based on login attempts. An attempt by a user to login to a destination server from a source server is identified. A destination score is determined based on the count of attempts by the user to login to the destination server and the count of attempts by the user to login to all destination servers. A source given destination score is determined based on the count of attempts by the user to login from the source server to the destination server, and the count of attempts by the user to login to the destination server. An outlier score is determined based values associated with the destination score and the source given destination score. An alert is output if the outlier score satisfies a threshold.

For example, an intrusion detection system identifies a user U attempting to login from a source server S to a destination server D. The intrusion detection system determines a destination score of 0.150 by dividing the user U's 15 recorded attempts to login to the destination server D by the user U's 100 recorded attempts to login to all destination servers. The intrusion detection system determines a source given destination score of 0.267 by dividing the user U's 4 recorded attempts to login from the source server S to the destination server D by the user U's 15 recorded attempts to login to the destination server D. The intrusion detection system determines an outlier score of 0.040 by multiplying the destination score of 0.150 by the source given destination score of 0.267. The intrusion detection system outputs an alert because the outlier score of 0.040 is less than the alert threshold of 0.050.

Machine-learning based systems and methods are described for intrusion detection based on login attempts. These methods can detect intrusions by modeling unusual behaviors using feature-based holistic approaches. As a result, users' normal login patterns can be modelled based on historical data, and the machine-learning algorithms can automatically detect unusual activities that could potentially be a result of an ongoing intrusion or an attempted intrusion. The intrusion detection system can detect unusual activity 24 hours a day and 7 days a week, and alert a security administrator when unusual activity is detected.

The system for intrusion detection based on login attempts is based on novel approaches. A sophisticated probabilistic methodology called Bayes Networks enables the modeling of unusual behavior more accurately than simple statistical methods. This methodology also naturally allows the capture of domain knowledge into the probabilistic model. This methodology further enables modeling for user-specific outlier scoring while also enabling user-independent modeling as well. Both types of models have benefits and limitations in the context of intrusion detection, such that an intrusion detection system that can accommodate both models is therefore more powerful. Since good feature engineering is important for machine learning that generalizes, the intrusion detection system is distinguished by casting features in a hierarchy to automatically learn unusual patterns at different levels of generality. To accommodate hierarchical features, and in particular for outlier detection, the intrusion detection system modifies the standard Bayes network probabilistic scoring in a unique way. A holistic approach combines methods from outlier single-event detection (in a Bayes Network framework) with outlier event ensemble detection (such as multiple unusual events happening, on possibly different resources in a short time period) with pattern-based (in particular, graph-based) approaches.

Given a data set of log-in attempts over a historical period, presumed to be normal activity on average, the intrusion detection system learns to identify unusual log-in attempts. Each login attempt is a tuple, such as user u, source s, destination d, day of week dy, hour of day hr, and status st. Source denotes the server from which the login attempt originated, destination denotes the target of the login attempted, and status denotes the success or failure of the login attempt. The score of an login attempt can be defined as the log-probability $$\log [P(u)P(s,d,dy,hr,st|u)] \quad \text{equation (1)}$$

Equation (1) reads as "the probability of user u multiplied by the probability of (s, d, dy, hr, st) for this user u." For example, the intrusion detection system determines in the training set (historical data set) that user u made 100 login attempts, and the total number of login attempts in this data set (across all users) is 10000. Then P(u) is 100/10,000=0.01. The basis for modeling P(u) is that if a user who rarely logs in—meaning her P(u) is very small—starts logging in frequently, then the intrusion detection system identifies these new login attempts as unusual. Another reason for using equation (1) is that it allows the model to be decomposed into a user-specific part, which is P(s, d, dy, hr, st|u). User-specific modeling is important in this use case. What is deemed as unusual behavior for a user u depends on what is found to be usual for this user. That is, unusualness is relative to every individual user's usual behavior. The second term inside equation (1) models user-specific normal behaviors. That is, the second term scores for its likelihood under user u's model. Specifically, the intrusion detection system forms the following Bayes Net $$P(s,d,dy,hr,st|u)=P(d|u)*P(s|d,u)*P((dy,hr)|d,u)*P(st|u) \quad \text{equation (2)}$$

Equation (2) reads as the probability of the combination of all of s, d, dy, hr, st for this particular user. As an example, if user u made 100 login attempts in the training set, and exactly 4 of these login attempts were successful from the source server A to the destination server B, on Monday between 2:00 PM and 3:00 PM, then P(s=A, d=B, dy=Monday, hr=2-3 pm, st=Pass|u) is 4/100. The issue with modeling combinations is that the number of possible combinations is so large that a database generally will not have enough training data to learn the probabilities reliably. For example, suppose the intrusion detection system has data for 1,000 servers, and suppose in principle a user can attempt to login from any server to any other server. So the number of (s, d) pairs is 499,500. Since a week has 7 days (some users will have weekend duty), each day has 24 hours, and the status st has two values, pass and fail, the total number of combinations is 499,500*7*24*2=167,832,000. So for every user, the intrusion detection system would have to record hundreds of millions of login attempts to reliably estimate the probability of a particular login event being unusual, which is clearly infeasible. The point of equation (2) is to make certain assumptions—as realistic as possible—so as to be able to learn what is unusual for a specific user from a significantly smaller set of login attempts, such as between 50 to 100 login attempts. The assumptions correspond to the four terms in the right hand side of equation (2).

P(d|u) estimates what proportion of all the login attempts (in the training set) by user u were to destination server d. So if user u made 100 login attempts overall, of which 15 were to server A, then P(d=A|u)=15/100.

P(s|d, u) estimates what proportion of the login attempts (in the training set) by user u to destination server d were attempted from source server s. So if in the 15 login attempts that user u made to server A, 4 attempts were made from server S, then P(s=S|d=A, u)=4/15.

P((dy, hr)|d, u) estimates by day and hour of day the login attempts (in the training set) by user u to destination server d. Note that the combination of (dy, hr) is intentionally modeled because this models reality better—without significantly increasing the size of the required training set for training. So if in the 15 login attempts that user u made to server A, 5 login attempts were on Tuesday (of which one attempt occurred during each of the hour slots 9:00 AM-10:00 AM, 10:00 AM-11:00 AM, 11:00 AM-12:00 PM, 2:00 PM-3:00 PM, and 4:00 PM-5:00 PM), 5 login attempts were on Thursday (all in the afternoon), and 5 login attempts were on Friday (all in the morning), the intrusion detection system would have, as one probability P((dy=Tuesday, hr=10:00 AM-11:00 AM)|u)=1/15, because only one of these 15 login attempts happened on a Tuesday between 10:00 AM to 11:00 AM. P(dy=Friday, hr sometime in the afternoon|u) will be lower than P(dy=Thursday, hr sometime in the afternoon|u) because on Thursday the user u logged in several times in the afternoon, but the user u did not attempt to login even once on Friday afternoon. So P((dy, hr)|d, u) models behaviors in which the user u attempts logins at different times of the day on different days of the week. Note that in the above example, the training data used is for only one week, but that is just to simplify the example, as the training data can span any number of weeks. If there are repetitive patterns (in login attempts) for this user for particular (day, time-of-day) combinations that cut across the weeks, the model will identify these patterns.

P(st|u) estimates what percentage of login attempts (in the training set) by user u resulted in status st. So if user u attempted 100 logins and 98 login attempts succeeded (and 2 login attempts failed), then P(st=pass|u)=98/100.

Equation (2) assumes, for tractability, that, for any given user u, source s and day hour (dy, hr) are conditionally independent given destination d and user u. Note that destination d and user u are allowed to influence source s, day dy, and hour hr directly. Also note that user u is allowed to influence status st and destination d directly. The particular form of equation (2) is based on the understanding of the domain. The intrusion detection system formulates as rich a probabilistic model as possible, so that direct dependencies between values of various attributes and combinations of values of other attributes can be captured if present in the data. At the same time, allowing each variable to be directly influenced by the combination of all other variables would lead to an intractable model that needs an unrealistically large training set. The assumptions made benefit tractability the most, while being the least restrictive.

Beyond the specific design of the Bayes network, one additional novelty in the approach is that the P(d|u) and the P(s|d, u) calculations can differ from the usual calculations in Bayes network—specifically, they can be heuristic calculations that leverage features of servers. For a server x, let F denote the set of features in the server. These features can be various tokens in the server's name, the security zone of the server, the owner group of the server, etc. As an example, consider the server whose name is util.ops.ash.jigsaw.com. Examples of textual features from this server's name are util.ops.ash.jigsaw.com, util, ops, ash, jigsaw, and com. Additionally, the intrusion detection system can add higher-order features, specifically features that capture combinations of adjacent tokens in the server name. In the server name example, these can be util.ops, ops.ash, ash.jigsaw, and jigsaw.com. The addition of higher order features can yield more accurate outlier models, provided that the intrusion detection system has enough historical data. Training with only lower-order features generally requires far less training data. That is, the use of higher order features—in addition to low-order ones—when there is not sufficient training data can actually yield lower accuracy. Beyond server-name based features, examples of other features are security zone=qe-techops-util and owner group=system-administrators. More subtle features could include tokens in the server name not explicitly present in the server name but deducible somehow. For example, a server may be a svqe server, but the server may have this token missing from its name. In terms of the features of servers, the heuristic estimates for P(s|d, u) and P(d|u) can be:

$$P(s|d,u) = \min_{f \in sF, g \in dF}(P(\text{source has } f | \text{destination has } g, u)) \quad \text{equation (3)}$$

$$P(d|u) = \min_{g \in dF}(P(\text{destination has } g|u)) \quad \text{equation (4)}$$

The intrusion detection system can enhance these equations further by modeling properties of users as well, such as user role. These roles can be system administrator, database administrator, developer, release engineer, security engineer, and so forth. To formalize this, let uF denote a feature vector for user u. The enhanced version of equation (3) can be $$P(s|d,u) = \min_{f \in sF, g \in dF, h \in uF}(P(\text{source has } f | \text{destination has } g, u \text{ has property } h)) \quad \text{equation (3')}$$

The enhanced version of equation (4) can be:

$$P(d|u) = \min_{g \in dF, h \in uF}(P(\text{destination has } g|u \text{ has property } h)) \quad \text{equation (4')}$$

By modeling properties of users as well, such enhanced versions can yield richer outlier models. That said, such models get much more complex, so require much more data to train to mitigate the risk of overfitting.

Capturing domain knowledge is the basis for understanding the use of the min or minimum operation in equations (3), (4), (3') and (4'), which may be trained from historical data. The intrusion detection system can also capture domain knowledge into these models, which may use so-called pseudo-counts for various parameters of the model. Approximately speaking, using pseudo-counts is as if the intrusion detection system has added additional fictional data items that capture domain knowledge to the historical data. As concrete examples, rules using security zones and ownership can be captured this way. Note that this type of model learns from both domain knowledge and historical data. Domain knowledge may be used to enforce certain hard constraints, and may be applied for a new user. For a new user, for whom the intrusion detection system has no historical data, the domain knowledge based learning gets outlier detection going for that user reasonably, using just domain knowledge. As the intrusion detection system tracks the new user's login attempts, the model learns the behavior of normal patterns for this particular user, which improves the accuracy of outlier detection for this user if the user's behaviors deviate from those of a generic user.

The following example illustrates equation (3), and serves as a basis for understanding the use of the min operation in equations (3), (4), (3'), and (4').

s=util.ops.ash.jigsaw.com,
d=dockerdmz07.ops.sv.figsaw.com.

The intrusion detection system observes that user u has just attempted a log-in from the source server s to the destination server d, and begins to determine how unusual this login attempt is.

P(s|d, u) =
　　min (
　　　　P(s has util.ops.ash.jigsaw.com | d has dockerdmz07.ops.sv.jigsaw.com, u),
　　　　...
　　　　P(s has ops.ash | d has sv.jigsaw.com, u),
　　　　P(s has ash | d has sv, u)
　　　　...
　　)

Consider the term P(s has util.ops.ash.jigsaw.com|d has dockerdMz07.ops.sv.figsaw.com, u). Suppose that in the historical data there are 5 instances in which user u logged into dockerdMz07.ops.sv.figsaw.com and in none of the instances the login was from util.ops.ash.jigsaw.com. Therefore, P(s has util.ops.ash.jigsaw.com|d has dockerdMz07.ops.sv.figsaw.com, u) should be close to 0, but not identical to 0. This is because there are only 5 instances in which user u logged into dockerdMz07.ops.sv.figsaw.com. Just because in none of these 5 instances the user u logged in from util.ops.ash.jigsaw.com does not mean that this can never happen. That is, the sample size is too small. Now consider P(s has ash|d has sv, u). It is reasonable to assume that the number of instances in which user u logged into a server that has sv in its name is much larger than 5, because dockerdMz07.ops.sv.figsaw.com is only one of the servers that has sv in its name. For this example, the number of instances in user u logged into a server that has sv in its name is 100. Suppose that in none of these instances the user u logged in from a server whose name has the token ash. The negative evidence from the 100 instances is much stronger than the negative evidence from the 5 instances. That is, P(s has ash|d has sv, u) should be much smaller than P(s has util.ops.ash.jigsaw.com|d has dockerdMz07.ops.sv.figsaw.com, u) because the 100 instances are a much better indicator of how unusual this login attempt is than the 5 instances. That is, the intrusion detection system interprets P(s|d, u) as estimating, given that user u attempted a login into destination d, how unlikely is it that this login attempt was made from source s.

Similarly, the intrusion detection system interprets P(d|u) as estimating how unlikely user u is to have attempted a login into destination d. The intrusion detection system's interest is in estimating this unlikelihood as well as possible—due to the focus on intrusion detection, the detection of unusual login attempts. In view of the above, the unlikelihood that user u attempts a login into destination d is most accurate for a feature of destination d that has the lowest probability of being in a destination that user u has logged into. To implement this probability of an unusual login attempt, the intrusion detection system uses pseudo-counts.

The intrusion detection system can set pseudo-counts for both probabilities (s has util.ops.ash.jigsaw.com|d has dockerdMz07.ops.sv.figsaw.com, u) and (s has ash|d has sv, u) to a suitable positive constant A. That is, the intrusion detection system fictionally creates A instances in which user u logged into dockerdMz07.ops.sv.figsaw.com from dockerdMz07.ops.sv.figsaw.com, and fictionally creates A instances in which user u logged into a server whose name has the token sv from a server whose name has the token ash. Now in the actual historical data there are 5 instances in which user u logged into dockerdMz07.ops.sv.figsaw.com, none of which were from util.ops.ash.jigsaw.com, and 100 instances in which user u logged into a server whose name has the token sv, none of which were from a server whose name has the token ash. So the negative evidence of the 100 instances is much higher than the negative evidence of the 5 instances. At the technical level, this means that the actual counts in the 100 instances override the pseudo-counts much more strongly than the actual counts in the 5 instances.

A detailed description of methods for predicting whether a server is a high-value target based on the server's name is discussed in commonly owned U.S. patent application Ser. No. 15/368,173 entitled, RULE SET INDUCTION, by Arun Kumar Jagota, filed Dec. 2, 2016, which is incorporated in its entirety herein for all purposes. The intrusion detection system can use a predictor that learns from a training set of server names labeled with whether or not the corresponding servers are high-value. The exact meaning of high-value can be controlled merely by the labeling of the data set. That is, if the definition of high-value changes, changing the labels in the data set and retraining suffices for the predictor to learn to use the new definition. A high-value sever can be a server that stores resources critical to a business, such as customer data, production code, etc. A high-value server can also be a server whose failure can cripple a service. Intruders may be more likely to attempt to login to high-value servers than low-value servers. Regardless of whether this is the case or not, logins to high-value servers deserve more scrutiny because logins to high-value servers have a higher risk associated with them. An intruder may steal critical data, or cripple a critical server. The intrusion detection system can take advantage of the predictor's ability to predict whether a server is a high-value server as follows. The intrusion detection system can add a Boolean feature isHighValueTarget to the feature vector dF of a server playing the role of destination server. This feature has the value true if and only if the predictor predicts that destination d is a high-value server. Using this feature, the outlier model that uses equations (1) through (4') can automatically determine which users tend to login to high-value servers and which users do not tend to login to high-value servers. This feature potentially improves the generalization ability of the outlier models. Specifically, if a new server becomes available for logins, and the predictor predicts that the new server is a high-value server based on the server's name, the intrusion detection system can use the outlier model to automatically identify login attempts to the new server from a user who does not usually log into high-value servers as suspicious.

A single unusual login attempt may be suspicious, but such a login attempt could trigger a false alarm. Many unusual logins over a short-time period, from the same user, or to the same destination server are collectively more suspicious. Therefore, the intrusion detection system can consider some important ensemble scenarios and determine scores for these scenarios. These ensemble scores can be suitable aggregates of scores (or other statistics) of individual logins in the ensemble. For each user u, and from the set of logins $L_{u,d}$ the user attempted on day d, the intrusion detection system can derive two statistics, the average of the outlier scores of these logins, denoted as $m_{u,d}$, and the number of logins, i.e. the cardinality of. $L_{u,d}$. The intrusion detection system can determine the historic time series of each of these statistics per user, and use these calculations to check whether user u's activity today is highly unusual. As an example, suppose the average daily score of user u over the past 60 days had a mean $m_u$ and a standard deviation $s_u$. Also, suppose the time series of these averages is best fit by a horizontal line, i.e. the averages are neither up-trending nor down-trending. Suppose today's average score for this user is $a_u$. If $a_u \leq m_u - 2 s_u$, this strongly suggests that user u's login activity today is very unusual relative to user u's history.

Similarly, by comparing the number of login attempts by user u today to the time series of those in previous days, the intrusion detection system can quantify how unusual today's number of login attempts is. The intrusion detection system can use two ensemble statistics because they pick up different types of unusual behavior. The average score may be used to check whether user u's activity today is, on average, much more unusual than on previous days. The number of attempted logins may be used to check whether the volume of this activity is significantly higher today. If both statistics are highly unusual today, then their combination is even more unusual.

The intrusion detection system can cluster the login attempts into a hierarchy of time-interval bins, based on user, destination, year, month, day, hour, and minutes, covering multiple time horizons. The minutes bin can be "every minute," "every 5 minutes," "every 30 minutes", etc. The time horizon can be extended to cover an interval of one hour or more by using the hour field in addition to minute field. Also note that day and hour provide additional temporal context for the time interval. The intrusion detection system can train on historical data for the same time-interval bin in the same context. From such training, the intrusion detection system can determine the previously noted average login unusualness score and number of attempted logins for different time horizons. Therefore, the intrusion detection system can score a user's login activity for how unusual it is, in the past minute, in the past 5 minutes, in the past 30 minutes, etc. The potential benefit from this approach is the possibility of early detection of suspicious activity.

Certain structural patterns of login attempts are more suspicious than other patterns. An example of a highly suspicious pattern is the following: a user logs in to a certain server A and in a short burst of time thereafter attempts to log in from server A to servers B, C, and D, especially if most of these login attempts fail. This pattern is indicative of the user having compromised server A and from there trying to login to certain other servers in rapid succession to attempt to login to certain target servers. Pattern-based approaches tend to have a low false positive rate. Additionally, detecting certain patterns can facilitate early detection of suspicious activity. This is the case for the pattern described above. While pattern-based approaches are commonly used in intrusion detection, the present disclosure's intrusion detection system's approach is novel in that it leverages the statistical outlier scoring for pattern detection. Consequently, the intrusion detection system's approach can not only detect an occurrence of a pattern, but also score it for how suspicious it is, based on a suitable aggregation of the suspiciousness scores of the individual login attempts in the pattern. In other words, the intrusion detection system's approach intelligently combines the structural information in the pattern with the statistical information of what is unusual for that user.

More formally, the intrusion detection system's ensemble score function for this pattern is as follows. For a given "width" parameter w, consider a time interval of [t, t+w] of width w. The intrusion detection system can partition the login attempts during this interval into sets $S_{u,s}(t, w)$ where u denotes a particular user and s denotes a particular source. The intrusion detection system can score each such set as follows:

$$S(S_{u,s}(t,w)) = \Sigma_{e \in Su,s(t,w)} e.\text{score} \quad \text{equation (5)}$$

where e.score is the login attempt score according to equations (1) through (4'). Note that for a particular u, s pair, equation (5) statistically scores the collection of events in which user u attempted to log in from the same server s to some server in time interval [t, t+w]. The more the number of such login attempts and the more unusual each login attempt is, the lower this score will be. Typically, w will not span more than a few minutes. This score function is most powerful to use for the time interval starting w minutes before the present, which enables immediate detection of suspicious login attempts, as the login attempts are happening. That said, this score function can also be used retroactively, to detect suspicious login attempts that happened in the past.

Methods and mechanisms for intrusion detection based on login attempts will be described with reference to example embodiments. The following detailed description will first describe a method for intrusion detection based on login attempts. Next, an example system for intrusion detection based on login attempts is described.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 2:
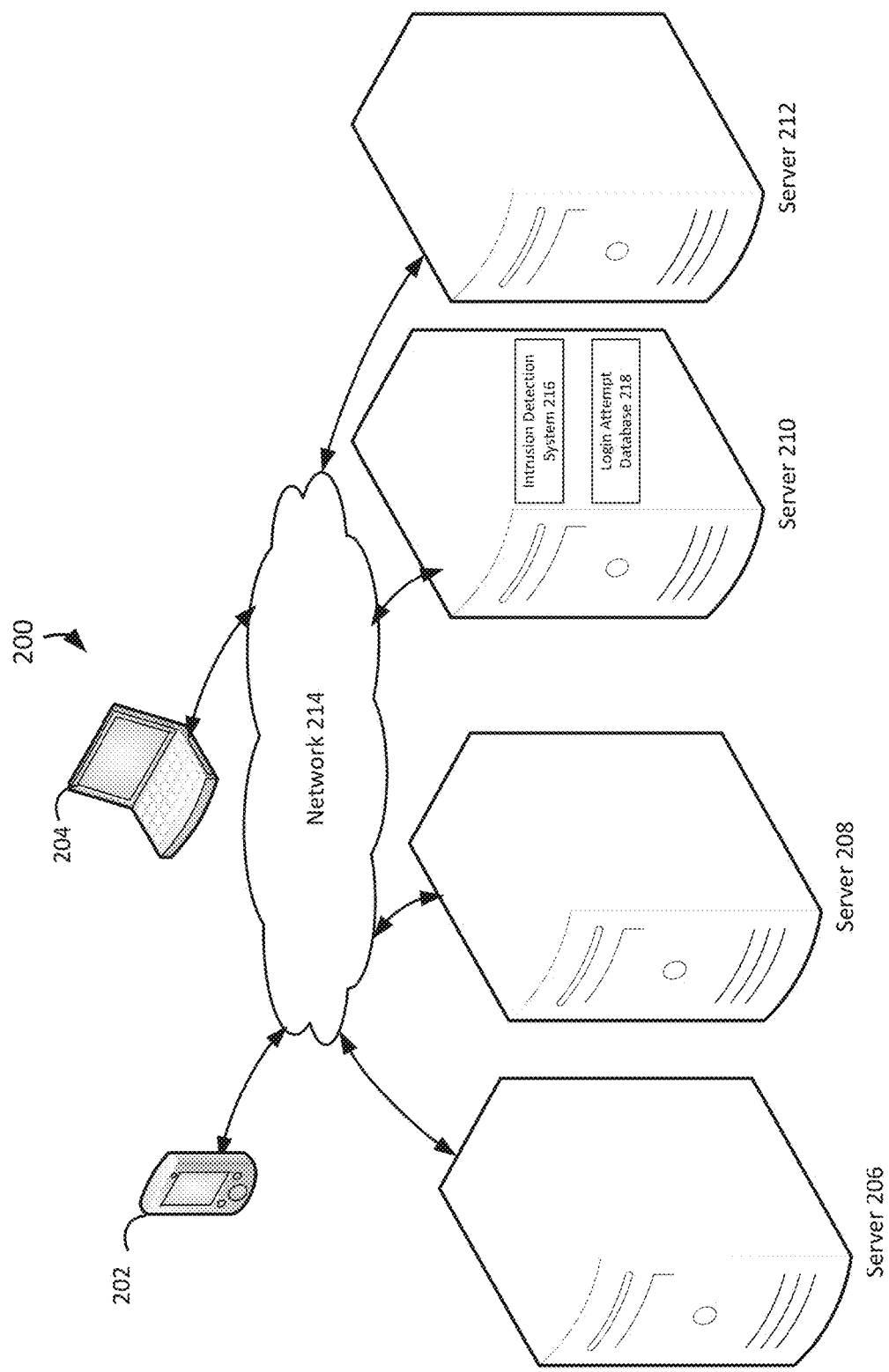
FIG. 2 depicts an example system for intrusion detection based on login attempts, in an embodiment.

FIG. 1 is an operational flow diagram illustrating a high level overview of a method 100 for intrusion detection based on login attempts. The example of a system 200 and its components 202-218 which are mentioned below in reference to FIG. 1 are depicted in FIG. 2 and described below in reference to FIG. 2.

An attempt by a user to login to a destination server from a source server is identified, block 102. The intrusion detection system estimates the probability that a user attempting to login to a server is attempting an intrusion into the server. For example and without limitation, this can include the intrusion detection system 216 identifying a user Ulysses attempting to login from the source server 206 named sv.ops.org to the destination server 210 named dmz.ash.com, as depicted in FIG. 2. An attempt can be the act by which an individual tries to achieve something. A login can be the act by which an individual gains access to a computing system. A source server can be a computing system that requests resources and/or services from a host computer that runs computer programs that share their resources and/or services with requesting computing systems. A destination server can be a host computer that runs computer programs that share their resources and/or services with requesting computing systems.

After the attempt to login is identified, a destination score is determined based on the count of attempts by the user to login to the destination server and the count of attempts by the user to login to all destination servers, block 104. The intrusion detection system estimates the unusualness of user attempting to login to the identified destination server, which can be represented mathematically by P(d|u) in equation (2), by equation (4), or by equation (4'). By way of example and without limitation, this can include the intrusion detection system 216 calculating a destination score of 0.151 by adding the pseudo count of 0.1 to the user Ulysses' 15 attempts to login to the destination server 210 that has the name dmz.ash.com, then dividing by the user Ulysses' 100 attempts to login to all destination servers, based on counts recorded in the login attempt database 218. In an example based on the user not having previously attempted to login to the identified destination server, the intrusion detection system 216 determines a destination score of 0.001 by adding the pseudo count of 0.1 to the user Ulysses' 0 attempts to login to the destination server 210 that has the name dmz.ash.com, and then dividing by the user Ulysses' 100 attempts to login to all destination servers, based on counts recorded in the login attempt database 218. A destination score can be a rating or grade associated with a host computer that runs computer programs that share their resources and/or services with requesting computing systems. A count can be a total number of something. Determining a destination score based on a count of attempts by a user to login to a destination server and a count of attempts by the user to login to all destination servers can be calculating a destination score based on a count of attempts by a user to login to a destination server divided by a count of attempts by the user to login to all destination servers.

Following the determination of the destination score, another destination score is optionally determined based on the count of attempts by the user to login to any destination server that has a specific set of features of the destination server, and the count of attempts by the user to login to all destination servers, block 106. The intrusion detection system estimates the unusualness of the user attempting to login to a destination server that has a specific set of features, which can be represented mathematically by equation (4) or by equation (4'). In embodiments, this can include the intrusion detection system 216 calculating a destination score of 0.201 by adding the pseudo count of 0.1 to the user Ulysses' 15 attempts to login to the destination server 210 that has the feature dmz in its name dmz.ash.com and to the user Ulysses' 5 attempts to login to the destination server 212 that has the feature dmz in its name docker.dmz.edu, then dividing by the user Ulysses' 100 attempts to login to all destination servers, based on counts recorded in the login attempt database 218. Although the preceding example describes the intrusion detection system 216 determining only one destination score based explicitly on a destination server feature, the intrusion detection system 216 can determine any number of destination scores based explicitly on destination server features. In an example based on the user not having previously attempted to login to the identified destination server, the intrusion detection system 216 determines a destination score of 0.051 by adding the pseudo count of 0.1 to the user Ulysses' 0 attempts to login to the destination server 210 that has the feature dmz in its name dmz.ash.com to the user Ulysses' 5 attempts to login to the destination server 212 that has the feature dmz in its name docker.dmz.edu, then dividing by the user Ulysses' 100 attempts to login to all destination servers, based on counts recorded in the login attempt database 218. A set of features can be a group of distinctive attributes of something. Determining another destination score based on a count of attempts by a user to login to any destination server that has a specific set of features of a destination server, and a count of attempts by the user to login to all destination servers can be calculating another destination score based on a count of attempts by a user to login to any destination server that has a specific set of features of a destination server, divided by a count of attempts by the user to login to all destination servers.

In addition to determining a destination score, a source given destination score is determined based on the count of attempts by the user to login from the source server to the destination server, and the count of attempts by the user to login to the destination server, block 108. The intrusion detection system estimates the unusualness of the user attempting to login to the identified destination server from the identified source server, which can be represented mathematically by $P(s|d, u)$ in equation (2), by equation (3), or by equation (3'). For example and without limitation, this can include the intrusion detection system 216 calculating a source given destination score by first summing the pseudo count of 0.1 with Ulysses' 4 attempts to login from the source server 206 that has the name sv.ops.org to the destination server 210 that has the name dmz.ash.com, to create the sum of 4.1, based on counts recorded in the login attempt database 218. Then the intrusion detection system 216 determines a source given destination score of 0.273 by dividing the sum of 4.1 by Ulysses' 15 attempts to login to the destination server 210 that has the name dmz.ash.com, based on counts recorded in the login attempt database 218. In an example based on the user not having previously attempted to login from the identified source server to the identified destination server, the intrusion detection system 216 determines a source given destination score by first summing the pseudo count of 0.1 with Ulysses' 0 attempts to login from the source server 206 that has the name sv.ops.org to the destination server 210 that has the name dmz.ash.com, to create the sum of 0.1, based on counts recorded in the login attempt database 218. Then the intrusion detection system 216 determines a source given destination score of 0.007 by dividing the sum of 0.1 by Ulysses' 15 attempts to login to the destination server 210 that has the name dmz.ash.com, based on counts recorded in the login attempt database 218. A source given destination score can be a rating or grade associated with a computing system that requests resources and/or services from a host computer that runs computer programs that share their resources and/or services with requesting computing systems. Determining a source given destination score based on a count of attempts by a user to login from a source server to a destination server, and a count of attempts by the user to login to the destination server can be calculating a source given destination score based on a count of attempts by a user to login from a source server to a destination server, divided by a count of attempts by the user to login to the destination server.

Once a source given destination score is determined, another source given destination score is optionally determined based on the count of attempts by the user to login from any source server that has a set of features of the source server to any destination server that has another set of features of the destination server, and the count of attempts by the user to login to any destination server that has the other set of features of the destination server, block 110. The intrusion detection system estimates the unusualness of the user attempting to login from a source server that has a specific set of features to a destination server that has another specific set of features, which can be represented mathematically by equation (3) or by equation (3'). By way of example and without limitation, this can include the intrusion detection system 216 calculating a source given destination score by first summing the pseudo count of 0.1 with Ulysses' 5 attempts to login from either the source server 206 that has the feature sv in its name sv.ops.org or the source server 208 that has the feature sv in its name util.sv.org to either the destination server 210 that has the feature dmz in its name dmz.ash.com or the destination server 212 that has the feature dmz in its name docker.dmz.edu, to create the sum of 5.1, based on counts recorded in the login attempt database 218. Then the intrusion detection system 216 determines a source given destination score of 0.255 by dividing the sum of 5.1 by Ulysses' 20 recorded attempts to login to either the destination server 210 that has the feature dmz in its name dmz.ash.com or the destination server 212 that has the feature dmz in its name docker.dmz.edu, based on counts recorded in the login attempt database 218. Although the preceding example describes the intrusion detection system 216 determining only one source given destination score based explicitly on a source server feature and a destination server feature, the intrusion detection system 216 can determine any number of source given destination scores based explicitly on source server features and destination server features. In an example based on the user not having previously attempted to login from the identified source server to any destination server, the intrusion detection system 216 determines a source given destination score by first summing the pseudo count of 0.1 with Ulysses' 0 attempts to login from either the source server 206 that has the feature sv in its name sv.ops.org or the source server 208 that has the feature sv in its name util.sv.org to either the destination server 210 that has the feature dmz in its name dmz.ash.com or the destination server 212 that has the feature dmz in its name docker.dmz.edu, to create the sum of 0.1, based on counts recorded in the login attempt database 218. Then the intrusion detection system 216 determines a source given destination score of 0.005 by dividing the sum of 0.1 by Ulysses' 20 recorded attempts to login to either the destination server 210 that has the feature dmz in its name dmz.ash.com or the destination server 212 that has the feature dmz in its name docker.dmz.edu, based on counts recorded in the login attempt database 218.

In addition to any destination scores and source given destination scores being determined, a temporal score is optionally determined based on the average count of attempts by the user to login to all destination servers during a historical time period and the count of attempts by the user to login to all destination servers during a current time period, the historical time period and the current time period being based on a contextually equivalent day of week and time of day, block 112. The intrusion detection system estimates the unusualness of the user attempting to login to the identified destination server on the current day of the week during the current time period, which can be represented mathematically by $P((dy, hr)|d, u)$ in equation (2). In embodiments, this can include the intrusion detection system 216 summing the pseudo count of 0.1 to Ulysses' historical average of 0.0 attempts to login on Sundays between 1:00 AM and 2:00 AM, and then dividing the sum of 0.1 by the user Ulysses' 1 current attempt to login on a Sunday between 1:00 AM and 2:00 AM, to determine the temporal score of 0.100, based on counts recorded in the login attempt database 218. In this example, the intrusion detection system 216 determined a relatively low temporal score in response to Ulysses' current attempt to login on a Sunday between 1:00 AM and 2:00 AM because data in the login attempt database 218 indicates that Ulysses never attempted to login on a Sunday between 1:00 AM and 2:00 AM, thereby indicating that the current login attempt is unusual behavior for Ulysses. Determining a temporal score based on an average count of attempts by a user to login to all destination servers during a historical time period and a count of attempts by the user to login to all destination servers during a current time period can be calculating a temporal score based on an average count of attempts by a user to login to all destination servers during a historical time period divided by a count of attempts by the user to login to all destination servers during a current time period.

In another example, the intrusion detection system 216 sums the pseudo count of 0.1 to Ulysses' historical average of 0.8 attempts to login on Tuesdays between 1:00 PM and 2:00 PM, and then dividing the sum of 0.9 by the user Ulysses' 1 current attempt to login on a Tuesday between 1:00 PM and 2:00 PM, to determine the temporal score of 0.900, based on counts recorded in the login attempt database 218. In this example, the intrusion detection system 216 determined a relatively high temporal score in response to Ulysses' current attempt to login on a Tuesday between 1:00 PM and 2:00 PM because data in the login attempt database 218 indicates that Ulysses often attempts to login on a Tuesday between 1:00 PM and 2:00 PM, thereby indicating that the current login attempt is usual behavior for Ulysses. A temporal score can be a rating or grade associated with time. A current time period can be a space of seconds, minutes, hours, days, weeks, months, or years that has an established beginning and an established ending in the present. A historical time period can be can be a space of seconds, minutes, hours, days, weeks, months, or years that has an established beginning and an established ending in the past. Contextually equivalent can be circumstances that form the setting for an event and correspond in value to other circumstances that form the setting for another event, such as previous Monday mornings' login attempts corresponding to the current Monday morning's login attempt.

Further to any destination scores and source given destination scores being determined, a success rate score is optionally determined based on a success rate of attempts by the user to login to all destination servers during a time period and a success rate of attempts by the user to login to all destination servers during an extended time period, the extended time period being relatively longer than the time period, block 114. The intrusion detection system estimates the unusualness of the user successfully attempting to login to the identified destination server, which can be represented mathematically by P(st|u) in equation (2). For example and without limitation, this can include the intrusion detection system 216 calculating a success rate score of 0.101 by dividing Ulysses' login success rate of 10% during the last hour by Ulysses' login success rate of 99% during the past 60 days. A success rate can be a frequency of accomplishing a goal. A success rate score can be a rating or grade associated with a frequency of accomplishing a goal. Each of a time period and an extended time period can be a space of seconds, minutes, hours, days, weeks, months, or years that has an established beginning and an established ending, with the extended time period being relatively longer than the time period. Determining a success rate score based on a success rate of attempts by a user to login to all destination servers during a time period and a success rate of attempts by the user to login to all destination servers during an extended time period can be calculating a success rate score based on a success rate of attempts by a user to login to all destination servers during a time period divided by a success rate of attempts by the user to login to all destination servers during an extended time period.

Not only are any destination scores and source given destination scores determined, a login attempt frequency score is optionally determined based on a frequency of attempts by the user to login to all destination servers during an extended time period and a frequency of attempts by the user to login to all destination servers during a time period, the extended time period being relatively longer than the time period, block 116. The intrusion detection system identifies a user's increased rate of login attempts as a probability that the user's current attempt to login to the identified destination server is an intrusion. By way of example and without limitation, this can include the intrusion detection system 216 calculating a login frequency score of 0.040 by dividing Ulysses' previous average of 2 login attempts per hour during the last 60 days by Ulysses' current average of 50 login attempts per hour during the most recent hour. A frequency of login attempts can be the rate at which an individual tries to gain access to any computing system. A login attempt frequency score can be a rating or grade associated with the rate at which an individual tries to gain access to any computing system. Determining a login attempt frequency score based on a frequency of attempts by a user to login to all destination servers during an extended time period and a frequency of attempts by the user to login to all destination servers during a time period can be calculating a login attempt frequency score based on a frequency of attempts by a user to login to all destination servers during an extended time period divided by a frequency of attempts by the user to login to all destination servers during a time period.

When the basis for an outlier score is determined, the outlier score is determined based on values associated with the destination score and the source given destination score, block 118. The intrusion detection system determines an outlier score based on values which indicate that a user's current attempt to login to the destination server may be an intrusion, which can be represented mathematically by equation (1). In embodiments, this can include the intrusion detection system 216 calculating an outlier score of 0.041 multiplying the destination score of 0.151 by the source given destination score of 0.273. The intrusion detection system 216 determines a relatively low outlier score for Ulysses' current attempt to login from the source server 206 that has the name sv.ops.org to the destination server 210 that has the name dmz.ash.com because data in the login attempt database 218 indicates that Ulysses attempting to login to this destination server 210 is relatively unusual and Ulysses attempting to login from this source server 206 to this destination server 210 is also unusual. Collectively, this combination of two relatively low probabilities indicates that Ulysses may be currently attempting an intrusion to the destination server 210. In contrast, the intrusion detection system 216 would have determined a destination score of approximately 0.500 if half of Ulysses' previous login attempts were to the destination server 210, and would have determined a source given destination score of approximately 1.000 if almost all of Ulysses previous attempts to login to the destination server 210 were from the source server 206, such that the intrusion detection system 216 would have determined a relatively high outlier score of approximately 0.500. Collectively, this combination of two relatively high probabilities would indicate that Ulysses' current attempt to login to the destination server 210 is usual behavior for Ulysses, and therefore probably not an intrusion. In these examples, the values associated with the destination score and the source given destination score are the numerical value of the destination score and the numerical value of the source given destination score.

In another example, the intrusion detection system determines an outlier score by first determining that the destination score of 0.151 is lowest destination score of the destination scores 0.151 and 0.201 determined for Ulysses' current attempt to login to the destination server 210, and also determining that the source given destination score of 0.255 is the lowest source given destination score of the source given destination scores 0.273 and 0.255 determined for Ulysses' current attempt to login to the destination server 210. Although this example describes the intrusion detection system 216 determining the lowest destination score out of two destination scores and determining the lowest source given destination score out of two source given destination scores, the intrusion detection system 216 can determine the lowest destination score out of any number of destination scores and can determine the lowest source given destination score out of any number of source given destination scores. Then the intrusion detection system 216 determines an outlier score of 0.039 multiplying the lowest destination score of 0.150 by the lowest source given destination score of 0.255. In this example, the values associated with the destination score and the source given destination score are the numerical value of the lowest destination score of all destination scores determined for the current login attempt and the numerical value of the lowest source given destination score of all source given destination scores determined for the current login attempt. A value is associated with a specific score even if the specific score is not the lowest of all scores, because the value is associated with the lowest score that is lower than the specific score. For example, the value 0.255 is associated with the source given destination score 0.273 because the value 0.255 is associated with the source given destination score 0.255 that is the lowest source given destination score and a lower source given destination score than the source given destination score of 0.273.

The outlier score may also be based on the temporal score, the success rate score, and/or the login attempt frequency score. For example, the intrusion detection system 216 determines an outlier score by first multiplying the destination score of 0.151 by the source given destination score of 0.255, by the temporal score of 0.100, by the success score of 0.101, and by the login attempt frequency score of 0.040 to result in the product of 0.000016, and then taking the common logarithm of the product of 0.000016 to result in the outlier score of negative 4.8. Although this example describes the intrusion detection system 216 using a common logarithm to determine an outlier score, the intrusion detection system 216 can use any function to determine an outlier score. An outlier score can be a rating or grade associated with thing differing from other members of a particular group.

Having determined the outlier score, an alert is caused to be outputted if the outlier score satisfies a threshold, block 120. The intrusion detection system takes preventative action if the outlier score indicates that a current login attempt may be an intrusion into the identified destination server. For example and without limitation, this can include the intrusion detection system 216 outputting an alert to a security administrator because the outlier score of 0.041 is less than the alert threshold of 0.050. In another example, the intrusion detection system 216 blocks Ulysses' current attempt to login to the destination server 210 because the outlier score of negative 4.8 is less than the alert threshold of negative 4.5. An alert can be a warning of a danger, threat, or problem, typically with the intention of having it avoided or dealt with. A threshold can be the magnitude or intensity that must be satisfied for a certain reaction, phenomenon, result, or condition to occur or be manifested.

When more than one outlier score has been determined, a comparative outlier alert is optionally caused to be outputted based on comparing a mathematical average of the outlier score during a time period with a mathematical average of the outlier score during an extended time period, the extended time period being relatively longer than the time period, block 122. The intrusion detection system can output an alert based on changes in outlier scores over time, which can be represented mathematically by equation (5). By way of example and without limitation, this can include the intrusion detection system 216 calculating an average outlier score of negative 4.0 for Ulysses' login attempts over the last hour, which is more than two standard deviations less than the average outlier score of negative 3.5 for Ulysses' login attempts over the past 60 days, even though the average outlier score of negative 4.0 is not less than the alert threshold of negative 4.5. A comparative outlier alert can be a warning of a danger, threat, or problem associated a measure of a thing differing from other members of a particular group. A mathematical average can be a number expressing the mean value in a set of data, which is determined by dividing the sum of the values in the set of data by the number of items in the set of data.

The method 100 may be repeated as desired. Although this disclosure describes the blocks 102-122 executing in a particular order, the blocks 102-122 may be executed in a different order. In other implementations, each of the blocks 102-122 may also be executed in combination with other blocks and/or some blocks may be divided into a different set of blocks.

FIG. 2 depicts an example system 200 for intrusion detection based on login attempts, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a computing system that includes a first client computing system 202, a second client computing system 204, a first server 206, a second server 208, a third server 210, and a fourth server 212. Although FIG. 2 depicts the first client computing system 202 as a smartphone 202 and the second client computing system 204 as a laptop computer 204, the client computing systems 202-204 may be any type of client computing systems 202-204. The client computing systems 202-204 and the servers 206-212 communicate via a network 214. The third server 210 includes an intrusion detection system 216 and login attempt database 218.

As an example of the functioning of the system 200, the user Ulysses uses his laptop 204 to access the source server 206 named sv.ops.org and attempt to login to the destination server 210 named dmz.ash.com. The intrusion detection system 216 identifies Ulysses attempting to login from the source server 206 to the destination server 210. First, the intrusion detection system 216 determines a destination score of 0.151 by adding the pseudo count of 0.1 to the user Ulysses' 15 attempts to login to the destination server 210, then dividing by the user Ulysses' 100 attempts to login to all destination servers, based on counts recorded in the login attempt database 218. Next, the intrusion detection system 216 determines a source given destination score of 0.273 by adding the pseudo count of 0.1 to Ulysses' 4 recorded attempts to login from the source server 206 to the destination server 210, and then dividing by Ulysses' 15 recorded attempts to login to the destination server 210, based on counts recorded in the login attempt database 218. Then the intrusion detection system 216 determines an outlier score of 0.041 multiplying the destination score of 0.151 by the source given destination score of 0.273. Finally, the intrusion detection system 216 outputs an alert to a security administrator because the outlier score of 0.041 is less than the alert threshold of 0.050.

Although FIG. 2 depicts the system 200 with two client computing systems 202-204, four servers 206-212, one network 214, one intrusion detection system 216, and one login attempt database 218, the system 200 may include any number of client computing systems 202-204, any number of servers 206-212, any number of networks 214, any number of intrusion detection systems 216, and any number of login attempt databases 218. The client computing systems 202-204 and the servers 206-212 may each be substantially similar to the hardware device 300 depicted in FIG. 3 and described below.

System Overview

Figure 3:
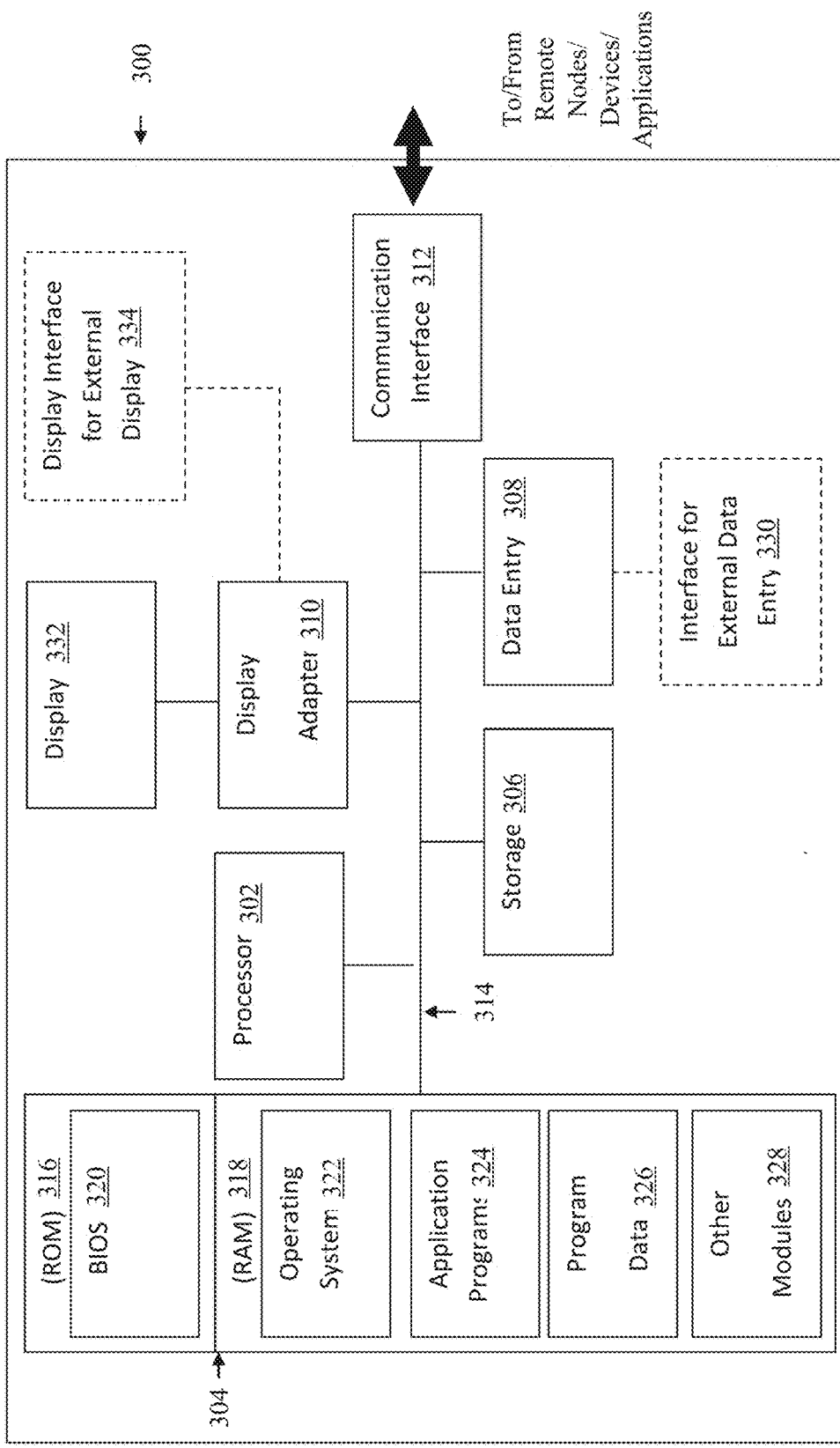
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
identify an attempt by a user to login to a destination server from a source server, the destination and source server coupled to an enterprise computer network having a plurality of destination servers;
determine a destination score based on a count of attempts by the user to login to the destination server, and a count of attempts by the user to login to all of the destination servers;
determine a source given destination score based on a count of attempts by the user to login from the source server to the destination server, and a count of attempts by the user to login to the destination server;
determine one of a success rate score based on a success rate of attempts by the user to login to all of the destination servers and a login attempt frequency score based on a frequency of attempts by the user to login to all of the destination servers, the attempts being made during a time period and an extended time period;
determine an outlier score based on values associated with the destination score, the source given destination score and one of the success rate score and the login attempt frequency score; and
cause an alert to be outputted in response to a determination that the outlier score satisfies a threshold.

2. The system of claim 1, wherein at least one of the count of attempts by the user to login to the destination server and the count of attempts by the user to login from the source server comprise a corresponding pseudo count that has a value less than one.

3. The system of claim 1, comprising further instructions, which when executed, cause the one or more processors to:
  determine another destination score based on a count of attempts by the user to login to any destination server on the enterprise computer network comprising a set of features of the destination server, and the count of attempts by the user to login to all destination servers; and
  determine another source given destination score based on a count of attempts by the user to login from any source server on the enterprise computer network comprising a set of features of the source server to any destination server comprising another set of features of the destination server, and a count of attempts by the user to login to any destination server comprising the other set of features of the destination server.

4. The system of claim 1, comprising further instructions, which when executed, cause the one or more processors to determine a temporal score based on an average count of attempts of the user to login to all destination servers during a historical time period and a count of attempts of the user to login to all destination servers during a current time period, the historical time period and the current time period being based on a contextually equivalent day of week and time of day, wherein the outlier score is further based on the temporal score.

5. The system of claim 1, wherein the extended time period being relatively longer than the time period.

6. The system of claim 1, comprising further instructions, which when executed, cause the one or more processors to cause a comparative outlier alert to be outputted based on comparing a mathematical average of the outlier score during a time period with a mathematical average of the outlier score during an extended time period, the extended time period being relatively longer than the time period.

7. A computer program product comprising a non-transitory computer-readable medium having computer-readable program code embodied thereon to be executed by one or more processors, the program code including instructions to:
  identify an attempt by a user to login to a destination server from a source server, the destination and source server coupled to an enterprise computer network having a plurality of destination servers;
  determine a destination score based on a count of attempts by the user to login to the destination server, and a count of attempts by the user to login to all of the destination servers;
  determine a source given destination score based on a count of attempts by the user to login from the source server to the destination server, and a count of attempts by the user to login to the destination server;
  determine one of a success rate score based on a success rate of attempts by the user to login to all of the destination servers and a login attempt frequency score based on a frequency of attempts by the user to login to all of the destination servers, the attempts being made during a time period and an extended time period;
  determine an outlier score based on values associated with the destination score, the source given destination score and one of the success rate score and the login attempt frequency score; and
  cause an alert to be outputted in response to a determination that the outlier score satisfies a threshold.

8. The computer program product of claim 7, wherein at least one of the count of attempts by the user to login to the destination server and the count of attempts by the user to login from the source server comprise a corresponding pseudo count that has a value less than one.

9. The computer program product of claim 7, wherein the program code comprises further instructions to:
  determine another destination score based on a count of attempts by the user to login to any destination server on the enterprise computer network comprising a set of features of the destination server, and the count of attempts by the user to login to all destination servers; and
  determine another source given destination score based on a count of attempts by the user to login from any source server on the enterprise computer network comprising a set of features of the source server to any destination server comprising another set of features of the destination server, and a count of attempts by the user to login to any destination server comprising the other set of features of the destination server.

10. The computer program product of claim 7, wherein the program code comprises further instructions to determine a temporal score based on an average count of attempts of the user to login to all destination servers during a historical time period and a count of attempts of the user to login to all destination servers during a current time period, the historical time period and the current time period being based on a contextually equivalent day of week and time of day, wherein the outlier score is further based on the temporal score.

11. The computer program product of claim 7, wherein the extended time period being relatively longer than the time period.

12. The computer program product of claim 7, wherein the program code comprises further instructions to cause a comparative outlier alert to be outputted based on comparing a mathematical average of the outlier score during a time period with a mathematical average of the outlier score during an extended time period, the extended time period being relatively longer than the time period.

13. A method comprising:
  identifying an attempt by a user to login to a destination server from a source server, the destination and source server coupled to an enterprise computer network having a plurality of destination servers;
  determining a destination score based on a count of attempts by the user to login to the destination server, and a count of attempts by the user to login to all of the destination servers;
  determining a source given destination score based on a count of attempts by the user to login from the source server to the destination server, and a count of attempts by the user to login to the destination server;
  determining one of a success rate score based on a success rate of attempts by the user to login to all of the destination servers and a login attempt frequency score based on a frequency of attempts by the user to login to all of the destination servers, the attempts being made during a time period and an extended time period;
  determining an outlier score based on values associated with the destination score, the source given destination score and one of the success rate score and the login attempt frequency score; and causing an alert to be outputted in response to a determination that the outlier score satisfies a threshold.

14. The method of claim 13, wherein at least one of the count of attempts by the user to login to the destination server and the count of attempts by the user to login from the source server comprise a corresponding pseudo count that has a value less than one.

15. The method of claim 13, wherein the method further comprises:
- determining another destination score based on a count of attempts by the user to login to any destination server on the enterprise computer network comprising a set of features of the destination server, and the count of attempts by the user to login to all destination servers; and
- determining another source given destination score based on a count of attempts by the user to login from any source server on the enterprise computer network comprising a set of features of the source server to any destination server comprising another set of features of the destination server, and a count of attempts by the user to login to any destination server comprising the other set of features of the destination server.

16. The method of claim 13, wherein the method further comprises determining a temporal score based on an average count of attempts of the user to login to all destination servers during a historical time period and a count of attempts of the user to login to all destination servers during a current time period, the historical time period and the current time period being based on a contextually equivalent day of week and time of day, wherein the outlier score is further based on the temporal score.

17. The method of claim 13, wherein the extended time period being relatively longer than the time period.

18. The method of claim 13, wherein the method further comprises
causing a comparative outlier alert to be outputted based on comparing a mathematical average of the outlier score during a time period with a mathematical average of the outlier score during an extended time period, the extended time period being relatively longer than the time period.

* * * * *